United States Patent
Pathak et al.

(10) Patent No.: US 8,639,549 B2
(45) Date of Patent: Jan. 28, 2014

(54) SYSTEM AND METHOD FOR DESIGNING SUPPLY CHAIN FOR COMMODITY PRODUCT DISTRIBUTION

(75) Inventors: Sujata S. Pathak, Newark, DE (US); Philippe Briet, Acheres (FR); Franck Mornet, Gif-sur-Yvette (FR); Nicoleta Neagu, Verrieres le Buisson (FR); Tejinder Pal Singh, Houston, TX (US)

(73) Assignee: L'Air Liquide Société Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 396 days.

(21) Appl. No.: 12/914,484

(22) Filed: Oct. 28, 2010

(65) Prior Publication Data

US 2012/0084106 A1 Apr. 5, 2012

Related U.S. Application Data

(60) Provisional application No. 61/388,266, filed on Sep. 30, 2010.

(51) Int. Cl.
*G06Q 10/00* (2012.01)
(52) U.S. Cl.
USPC .................................. 705/7.12; 705/7.13
(58) Field of Classification Search
USPC ...................... 705/7.11, 7.12, 7.13
See application file for complete search history.

(56) References Cited

U.S. PATENT DOCUMENTS

| 5,953,707 A * | 9/1999 | Huang et al. ............... 705/7.25 |
| 2002/0072956 A1* | 6/2002 | Willems et al. ............ 705/10 |
| 2006/0178918 A1* | 8/2006 | Mikurak ....................... 705/7 |
| 2012/0084106 A1* | 4/2012 | Pathak et al. ............... 705/7.11 |

OTHER PUBLICATIONS

Simulation Model of the Logistic Distribution in a Medical Oxygen Supply Chain—by Constantino et al. Department of Mechanical and Aeronautical Engineering University of Rome 2005.*

* cited by examiner

*Primary Examiner* — Andre Boyce
*Assistant Examiner* — Ernest A Jackson
(74) *Attorney, Agent, or Firm* — Elwood L. Haynes

(57) ABSTRACT

Techniques are disclosed for designing a supply chain distribution network. A network design tool may be configured to facilitates strategic decision making for a producer/distributor of a commodity products (e.g., molecular gas mixtures stored in cylinders) by incorporating transportation costs (i.e., operational decisions) into the strategic decision making process. Further, the network design tool may also integrate investment decision costs, which are usually considered 'tactical decisions', into the strategic decision process (e.g., which filling tools are assigned to which plant/hub location). The network design tool implements different algorithm approaches allowing a user to obtain optimal, near-optimal, and approximate solutions.

15 Claims, 6 Drawing Sheets

SYSTEM AND METHOD FOR DESIGNING SUPPLY CHAIN FOR COMMODITY PRODUCT DISTRIBUTION

CROSS-REFERENCE TO RELATED APPLICATIONS

This application claims the benefit of U.S. Provisional Application No. 61/388,266, filed Sep. 30, 2010, the entire contents of which are incorporated herein by reference.

BACKGROUND

A supply chain generally refers to a system of organizations, people, technology, activities, information and resources involved in moving products (e.g., raw materials) from one point (such as a manufacturer's facility) to another (such as a customer's distribution or manufacturing center). For example, a supply chain may be used to describe the production and delivery of gaseous (or liquid) substances stored in pressurized tanks (often referred to as cylinders) to customers. In such a supply chain, a producer may generate product using an air separation unit (ASU) to separate atmospheric air into gaseous components (e.g., oxygen gas ($O_2$), nitrogen gas ($N_2$), hydrogen gas ($H_2$), Argon gas (Ar), etc.). The purified gases (or mixtures thereof) may be stored at high pressure in a cylinder and distributed to customers. At a filing station, cylinders are filled for delivery to customers and returned (for refilling). Elements of this supply chain (i.e., the filling, delivering, retrieving and refilling cylinders) itself may be a component of other supply chains for the customers where the product is delivered. Such a supply chain uses the materials in the cylinders in manufacturing or other production activities, resulting in the creation and distribution of products to other customers.

A typical cylinder supply chain network consists of the filling/production centers, hubs/distribution centers, and customers. Filling centers supply cylinders to hubs, from which filled cylinders are distributed to customers. Stocks of cylinders at the hubs enable the operator of a cylinder supply chain distribution network to maintain a certain service level and react to uncertainty in the supply chain (e.g., fluctuations in demand from the customers). The agility of the supply chain and the operational efficiency are constrained by the structure of the network determining the flow of material. Determining the locations of the filling stations and hubs is typically considered a strategic decision, made apart from the operational level decisions such as the inventory management and shipping or transportation costs included by a supply chain distribution network.

SUMMARY

Embodiments of the invention provide a system for organizing cylinder deliveries. One embodiment of the invention includes a computer-implemented method for determining a configuration for a supply chain for a cylinder gas distribution network. The method itself may generally include receiving a set of input data characterizing attributes of the supply chain to be configured. For example, the input data may include at least (i) a set of potential locations for one or more distribution hubs and one or more filling plants for the supply chain, (ii) a set of one or more customer locations, (iii) a set of one or more products available to be delivered to the customers from the distribution hubs. This method may also include merging the one or more products characterized in the input data into one normalized product, and also includes determining, by operation of an equivalent cylinder solver, a secondary transportation solution. The secondary transportation solution fixes one or more locations for distribution hubs from the set of potential locations as well as specifies transportation flows from the fixed distribution hubs to each of the set of one or more customers using the normalized product. This method may still further include determining, by operation of a primary stock solver, a primary transportation solution, wherein the primary transportation solution fixes one or more locations for filling plants, from the set of potential locations, and specifies transportation flows from the fixed filling plants to the fixed distribution hubs using the secondary transportation solution.

Other embodiments of the invention include computer computer-readable storage media containing a network design tool configured to perform the above recited method and a system having a processor and a memory storing a program configured to perform the above recited method.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers.

DESCRIPTION OF PREFERRED EMBODIMENTS

Figure 1:
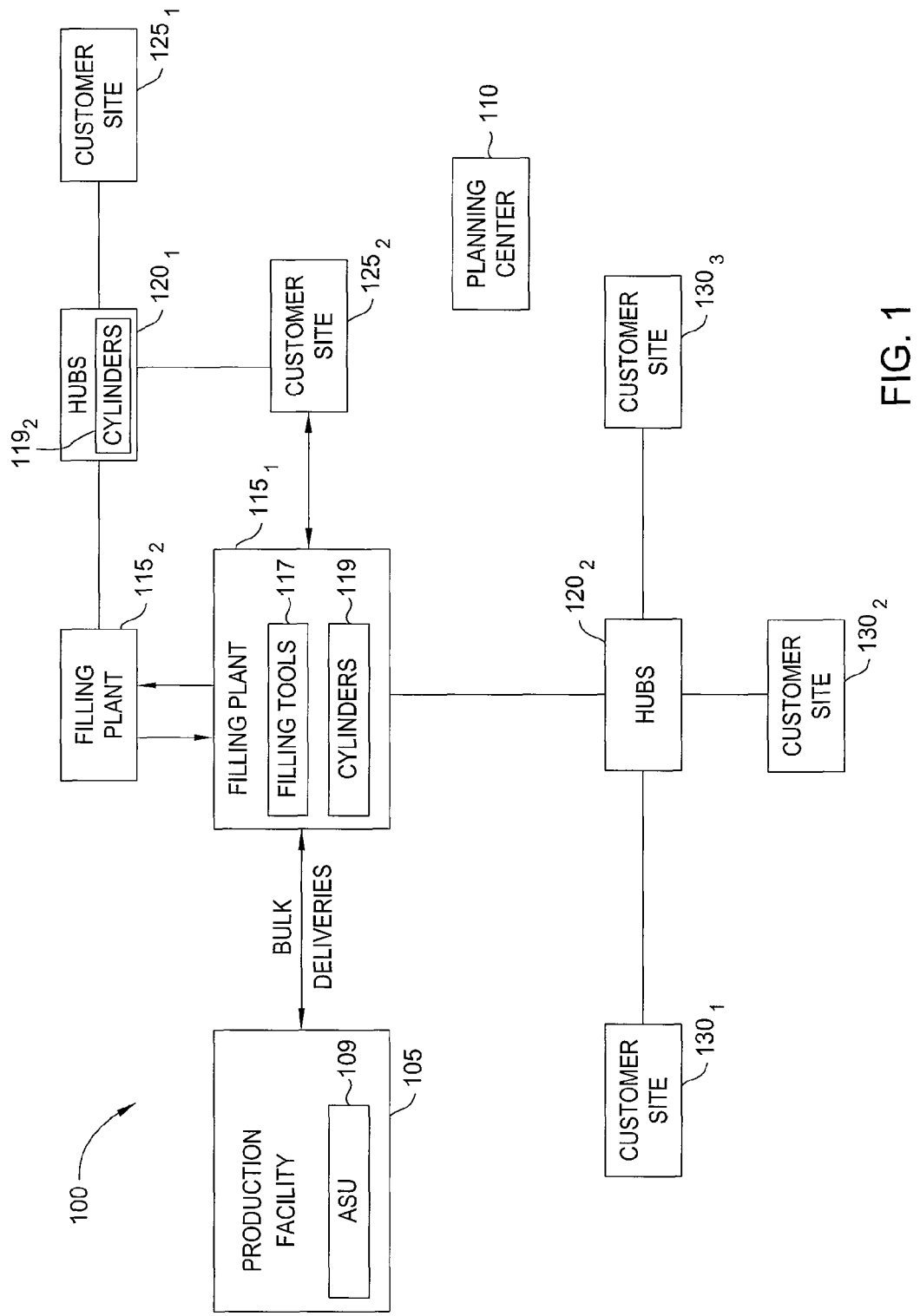
FIG. 1 illustrates an example supply chain for a cylinder distribution network, according to one embodiment of the invention.

As described in greater detail below, embodiments of the invention provide a computer-implemented network design tool configured to identify a desirable arrangement for a commodity supply chain network, e.g., a supply chain distribution network for delivering molecular gases via cylinders. In one embodiment, the network Design tool is a strategic optimization tool designed to assist logistics experts in making decisions regarding the commodity supply chain network configuration. More specifically, the network design tool may help determine optimal locations for facilities (e.g., filling plants & hubs), the filling plants production requirements (e.g., what filling tools to include at a filling plant), the inventory to stock at plants and which customers are delivered product from which hub. Further network design tool may help determine an amount of volume of products routed along primary transportation paths (i.e., from a production facility to a filling plant) and secondary transportation paths (i.e., from a filling plant (or hub) to a customer site).

In one embodiment, the network design tool can be used to determine a new cylinder supply chain/logistics network for a new market or to study the impact of change in different elements of the supply chain, e.g., when new customer accounts are opened or old accounts are closed, change in customer demand, impact of new filling centers/hubs and assets like filling tools, manpower, inventory, etc.

In one embodiment, a mathematical model is used to describe a current cylinder distribution network. The mathematical model specifies constraints on network structure, primary transportation (i.e., a flow of cylinders among different producer/distributor locations), and secondary transportation (i.e., a flow of cylinders from producer/distributor locations to customers, stock management and assets management). The model is evaluated to determine: the locations for the filling plants and hubs, production levels at each filling plant, the primary and secondary flows, and the inventory at plants/hubs. The model can also capture the existing network configuration, e.g., currently open filling plants/hubs, location-customer links.

In addition to providing a user interface configured to read in a problem definition and write back a solution to a file (e.g., a database file or a spreadsheet), the network design tool includes a network design solver. The network design solver may be configured to generate a recommendation for configuring a supply chain using linear programming techniques (e.g., the simplex algorithm and variants thereof), as well as using other approaches for solving linear/integer problems and mixed integer problems(MIP). As described below, the network design solver may be configured to decompose a network design problem (described using a set of constraint data using the mathematical model) into multiple sub-problems, solved (and optimized) using a number of sub-solvers.

Advantageously, the network design tool integrates decisions related to the inventory and transportation costs (i.e., operational decisions) into the strategic decision process when generating recommended plant/hub locations for a cylinder distribution supply chain. Further, the network design tool also integrates investment decision costs, which are usually considered 'tactical decisions', into the strategic decision process (e.g., which filling tools are assigned to which plant/hub location). Further still, the network design tool may employ a heuristic/approximation algorithm for large-scale network design problems (e.g., a network with 12000 customers, 43 products, 26 locations, etc), allowing reasonable approximations for network designs that are computationally infeasible to compute in a reasonable amount of time. The proposed tool implements different algorithm approaches allowing a user to obtain optimal, near-optimal, and approximate solutions. More simply, unlike currently available strategic design tools, the network design tool disclosed herein takes into consideration, simultaneously, production, inventory, transportation, and investment decisions when making strategic recommendations (e.g., optimal plant/hub locations) for real, large-scale cylinder distribution networks.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified herein.

Additionally, the following description details an embodiment of the invention used to generate desirable arrangement for a commodity supply chain network, e.g., a supply chain distribution network for delivering molecular gases via cylinders. However, it should be understood that embodiments of the invention may be adapted for use with a broad variety of other supply chain networks with comparable characteristics, e.g., other commodity products delivered from a central distribution point on a regular basis. Accordingly, references to the delivery of cylinders storing refined gases (or vaporizable liquids) are provided to be illustrative and not limiting.

FIG. 1 illustrates an example supply chain for a cylinder distribution network 100, according to one embodiment of the invention. As shown, the network 100 includes a production facility 105, a planning center 110, and also includes two filling plants $115_{1-2}$ and two distribution hubs $120_{1-2}$. The production facility 105 includes one or more air separation units (ASUs) 109 used to refine gaseous products from atmosphere. The resulting gases may be transported to the filling plants $115_{1-2}$ and stored in large tanks (e.g., via a pipeline or via delivery trucks). Filling plants $115_{1-2}$ may include filling tools 117 and a supply of cylinders 119. The supply of cylinders 119 may include a working stock of cylinders used to meet customer demand as well as a safety stock used to provide a buffer against unanticipated changes in customer demand. The cylinders 119 are filled using the filling tools 117 and distributed to hubs $120_{1-2}$. Cylinders 119 may also be distributed from the filling plant to customer sites 125. The movement of products between the production facility 105 and the filling plants $115_{1-2}$, as well as between the filling plants $115_{1-2}$ and the distribution hubs $120_{1-2}$, is generally referred to as primary transportation. Also note, cylinders 119 can also be moved between the filling plants $115_{1-2}$ as appropriate.

From the distribution hubs $120_{1-2}$, filled cylinders 119 are delivered to customer sites, where empty cylinders may be retrieved and returned to the distribution hubs $120_{1-2}$. Thus, the hubs 120 may store a supply of cylinders 119, including a working supply and a safety stock. For example, as shown in cylinder distribution network 100, the distribution hub $120_1$ delivers cylinders to customers $125_{1-2}$ and the distribution hub $120_2$ delivers cylinders to customers $130_{1-2}$. The transportation of cylinders from the distribution hubs $120_{1-2}$ to the customers 125 and 130 is generally referred to as secondary transportation. Additionally, secondary transportation can occur between a filling plant and a customer site $125_2$ directly, as shown between filling plant $115_1$ and customer site $125_2$.

The planning center 110 may generally be used to coordinate the activities of the production facility 105, the filling stations $115_{1-2}$, and the distribution hubs $120_{1-2}$ in delivering cylinders to customer sites $125_{1-2}$ and $130_{1-2}$. For example, the planning center 110 may receive orders for cylinders 119 from the customers at customer sites, schedule such orders for delivery, as well as set and monitor production at production facility 105. In one embodiment, personnel at the planning center 110 may use the network design tool described herein to facilitate the strategic decision making process regarding where to open (or close) a filling plant 115 or a distribution hub 120. For example, a producer may desire to expand existing operations into a new area or need to add additional plant'/hub capacity to service the needs of new customers. In such cases, the network design tool may evaluate a set of potential locations for distribution hubs and filling plants, the characteristics of such locations, as well as a variety of constraints particular to a producer/distributor. Note, one of ordinary skill in the art will recognize that the presentation of the cylinder distribution network 100 shown in FIG. 1 is simplified to highlight aspects of the present invention.

Figure 2:
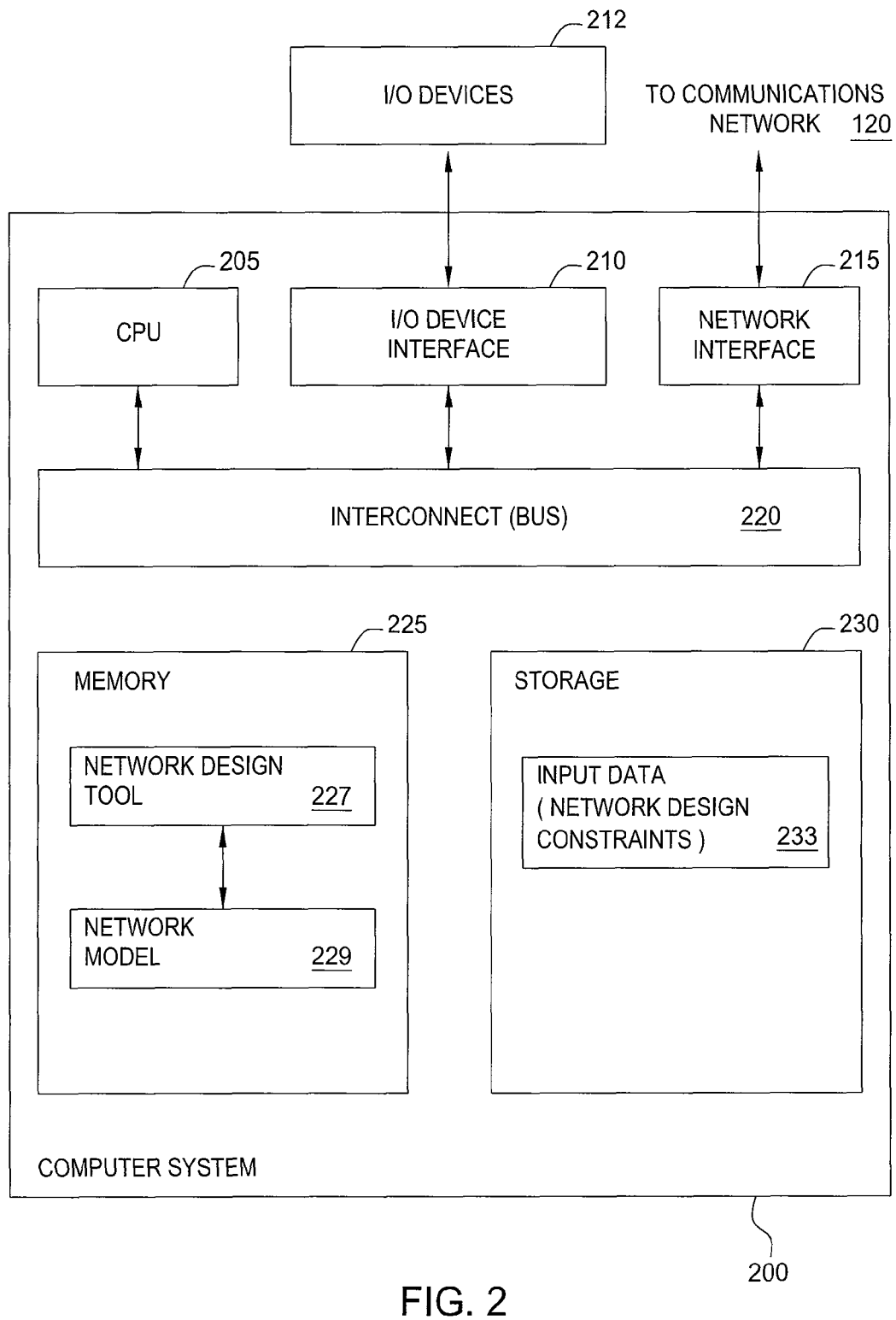
FIG. 2 is a view of a computing system that includes a network design tool configured to generate a proposed supply chain model for a cylinder distribution network, according to one embodiment of the invention.

FIG. 2 is a view of a computing system 200 that includes a network design tool 227 configured to generate a proposed supply chain model 229 for a cylinder distribution network, according to one embodiment of the invention. As shown, the computer system 200 includes, without limitation, a central processing unit (CPU) 205, a network interface 215, an interconnect 220, a memory 225, and storage 230. The computer system 200 may also include an I/O device interface 210 connecting I/O devices 212 (e.g., keyboard, display and mouse devices) to the computer system 200.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 contains the network design tool 227 and the network model 229 and the storage 230 contains input data 233 describing a collection of constraints modeling a supply chain distribution network. For example, the input data 233 may include current and potential filling plant and hub locations, current and potential customer locations, filling plant capabilities, equipment, product and materials data, transportation costs, material costs, customer requirements, etc. In one embodiment, the network design tool 227 provides a software application which allows a producer/distributor of cylinders to generate a recommended configuration for a supply chain distribution network, represented in FIG. 1 as network model 229.

Some network design problems processed by the design tool 227 can be very large-scale problems and require heuristic/approximation approaches to allow them to be solved them in a reasonable time. Accordingly, the design tool 227 may implement multiple solvers for processing input data 233 in order to provide a network model 229 which provides optimal, near-optimal, and/or approximate solutions. In one embodiment, therefore, the design tool 227 may include multiple solvers. For example, the design tool 227 may include a "main solver," an "equivalent cylinder solver," and a "two step" solver. The main solver provides optimal/near optimal solution by solving a complete problem represented by input data 233. However, the computation time required to evaluate a complete problem frequently makes using the main solver impractical for evaluating anything but very small distribution networks or smaller test case scenarios. This occurs as the time required to generate a solution can grow exponentially relative to the number of constraints specified in input data 233. To address this, the equivalent cylinder solver reduces the problem size by combining different products (i.e., different gas mixtures and cylinder sizes) into a single, normalized product and provides only an approximate solution for distributing cylinders to customers, based on the normalized product.

The two step solver uses a heuristic approach. First, it creates an initial solution using the equivalent cylinder solver. The two step solver then retains the secondary transportation solution elements of initial solution. The secondary transportation solution elements specify transportation flows from one (or more) distribution hubs to customers. That is, the secondary transportation solution specifies which hub within a supply chain should be used to deliver product to a given customer. The two step solver then solves the residual problem without solving for secondary transportation, instead using the secondary transportation solution obtained from the equivalent cylinder solver. That is, once the equivalent cylinder solver fixes the delivery solution for providing each customer with cylinders from a distribution hub, the secondary solver then solves the input data using the fixed delivery solution provided by the equivalent cylinder solver.

In one embodiment, the solution generated by the two step solver may be refined using a heuristic to further optimize the filling plants among hub locations obtained by the two step solver. The heuristics modify the solution by making a filling plant a hub, or opening a filling plant at a hub or exchanging a filling plant with a location that is only a hub, evaluating the modification, and keeping it when it provides an improvement. This may be repeated a number of times, to allow the heuristic two step solver to move within a local search space near the general solution of the two step solver in order to see whether a solution may be improved upon.

The end user can configure the type of the solver to be used in the analysis in the application and set other system parameters to determine the acceptable level of solution quality. The main solver, which provides the optimal solution, can be used only for small data sets, whereas for larger data sets the heuristic approaches provided by the equivalent cylinder solver, the two step solver, and two steps with additional heuristics can be applied.

The network model 229 may specify a location for one or more filling plants and/or hubs, as well as a recommendation for product flows over a primary transportation network (i.e., from a production facility to the filling plants/hubs) and a secondary transportation network (i.e., from the distribution hubs to customers) as well as a preferred hub from which to deliver product to each customer (as specified in the input data 233).

Figure 3:
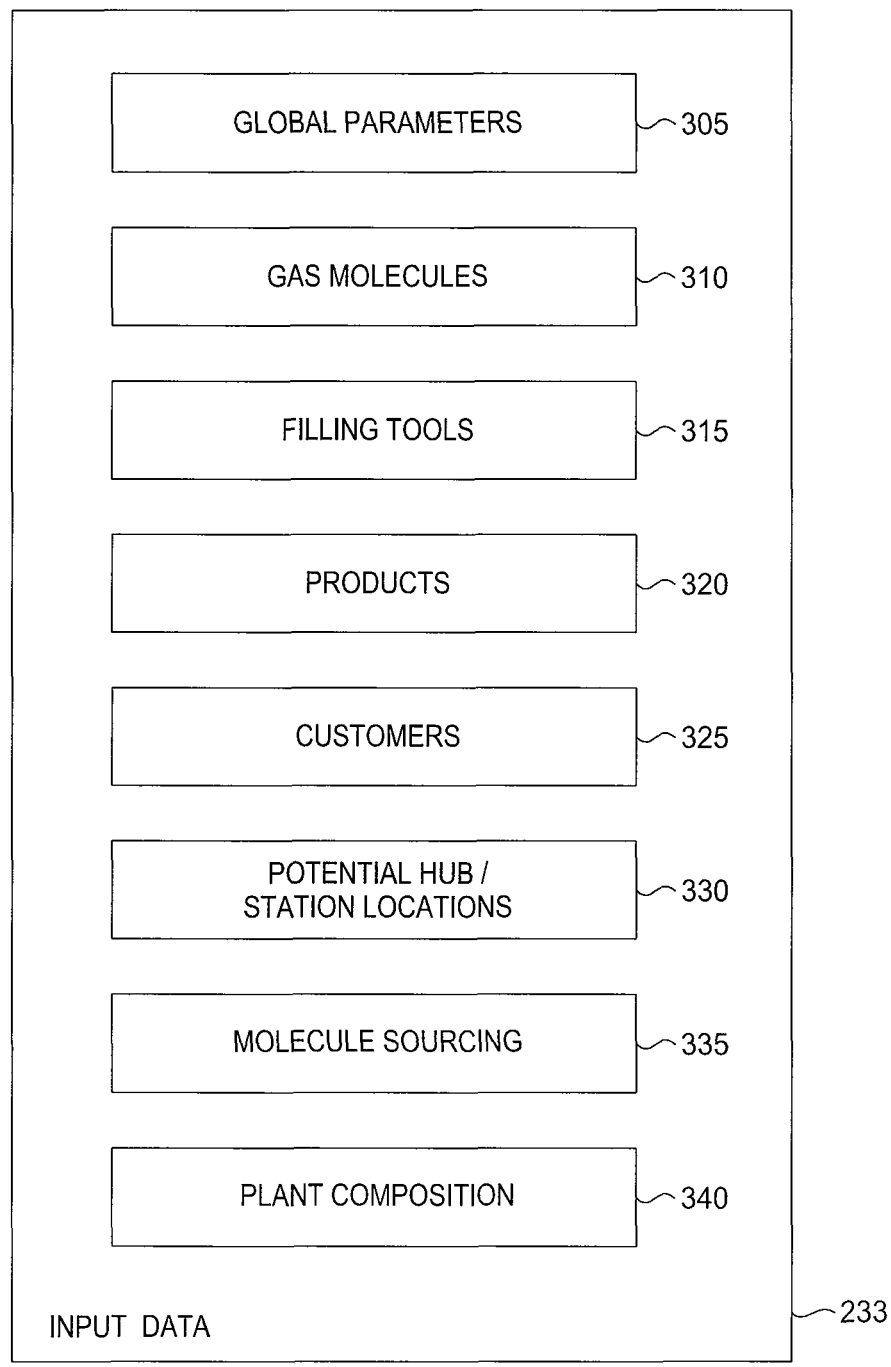
FIG. 3 illustrates an exemplary list of input data used by the network design tool to determine a network configuration, according to one embodiment of the invention.

As noted above, a cylinder supply chain network includes filling plants where cylinders are filled with gases, hubs which serve as distribution centers, and customers. Determining a network configuration requires determining the flow of material (i.e., cylinders) from source points (i.e., filling plants) to points of consumption (i.e., customers) from an appropriate set of input data. FIG. 3 illustrates an exemplary list of input data 233 used by the network design tool 227 to determine a network configuration, according to one embodiment of the invention. As shown, the input data 233 includes global parameters used to construct the model of a supply chain distribution network supplied to the network design tool for evaluation. For example, global parameters 305 may include minimum/maximum number of filling plants, vehicle capacity for primary/secondary transportation and average duration per customer delivery etc.

Gas molecule data 310 represents a list of gas molecules available from a production facility (or otherwise). That is, the gas molecule data 310 corresponds to the raw materials for producing products at the filling stations used to fill cylinders. Filling tools data 315 provides a list of filling tools used to fill cylinders. Some filling tools may be capable of filling a variety of different cylinders, while others may be limited to certain cylinder types (or products). Accordingly, the filling tools data 315 includes data specifying the available (or potentially available) product and filling tool combinations.

Products 320 provides a list of different products available for distribution from a filling plant to a distribution hub (and ultimately, to customers). Customer data 325 provides a list of customers that require such products. For example, customer data 325 may include an indication of a given customer's demand for different products, any contractual requirements (and pricing) for delivering a minimum (or maximum) product volume to a given customer. Potential location data 330 provides a list of potential locations to serve as filling plants/hubs, and may include location data for actual locations. For example, a producer may wish to add a new distribution hub to service customers form an existing filling plant, but have a variety of potential locations for such a hub. In such a case, the potential location data 330 would include a location for the existing filling plant, any existing distribution hubs, and a list of potential locations for a new distribution hub.

The plant composition data 340 provides an indication of a minimum and maximum of filling tools at each of potential (or actual) filling plant location. Molecule sourcing data 335 provides information about the availability of gas molecules at the locations (and/or potential locations). That is, the molecule sourcing data 335 explains about what molecules are available at what filling plants and at what price, along with the maximum capacity of molecules (i.e., not the mixed products, but gas molecules).

Taken together, the data 305-340 describe a supply chain composed from a set of potential (and actual) locations that can serve as filling plants/hubs, customers' profiles and assets required at the filling/distribution facilities. Of course, one of ordinary skill in the art will recognize that additional constraints may be added as input data to suit the needs of a particular case.

For example, optional input data may include data describing elements of an existing network. In such a case, the input data 233 could include customer sourcing data linking one or more customers to a plan/hub for product sourcing as well as include data specifying demand variation by each customer for each product, and limitations on the minimum and maximum production at the existing filling locations. Additionally, primary transportation data could provide information about the product flow for primary transportation among filling plants/hubs (i.e., how much product is transported between two locations could be characterized by providing min and max limits). Similarly, primary replenishment data could specify what should be the min and max replenish periods between two hubs. And Location Stock data could specify how much stock for each product should be at a plant/hub (also defined by providing min/max limits). Similarly still, for dangerous products, input data 233 could specify how much volume of dangerous molecules is allowed to be stored at a location (plant/hub).

Once defined, the input data 233 is provided to a network design tool, which evaluates the input data 233 and generates a solution. In particular, the network design tool may generate a fixed list of filling plants/distribution hubs, along with primary transportation flows (i.e., from production facilities to the filling plants and hubs) and secondary transportation flows (i.e., from the hubs to customers). Depending on the problem size and the desired computation time, users may choose among different solving methods made available by the network design tool.

Figure 4:
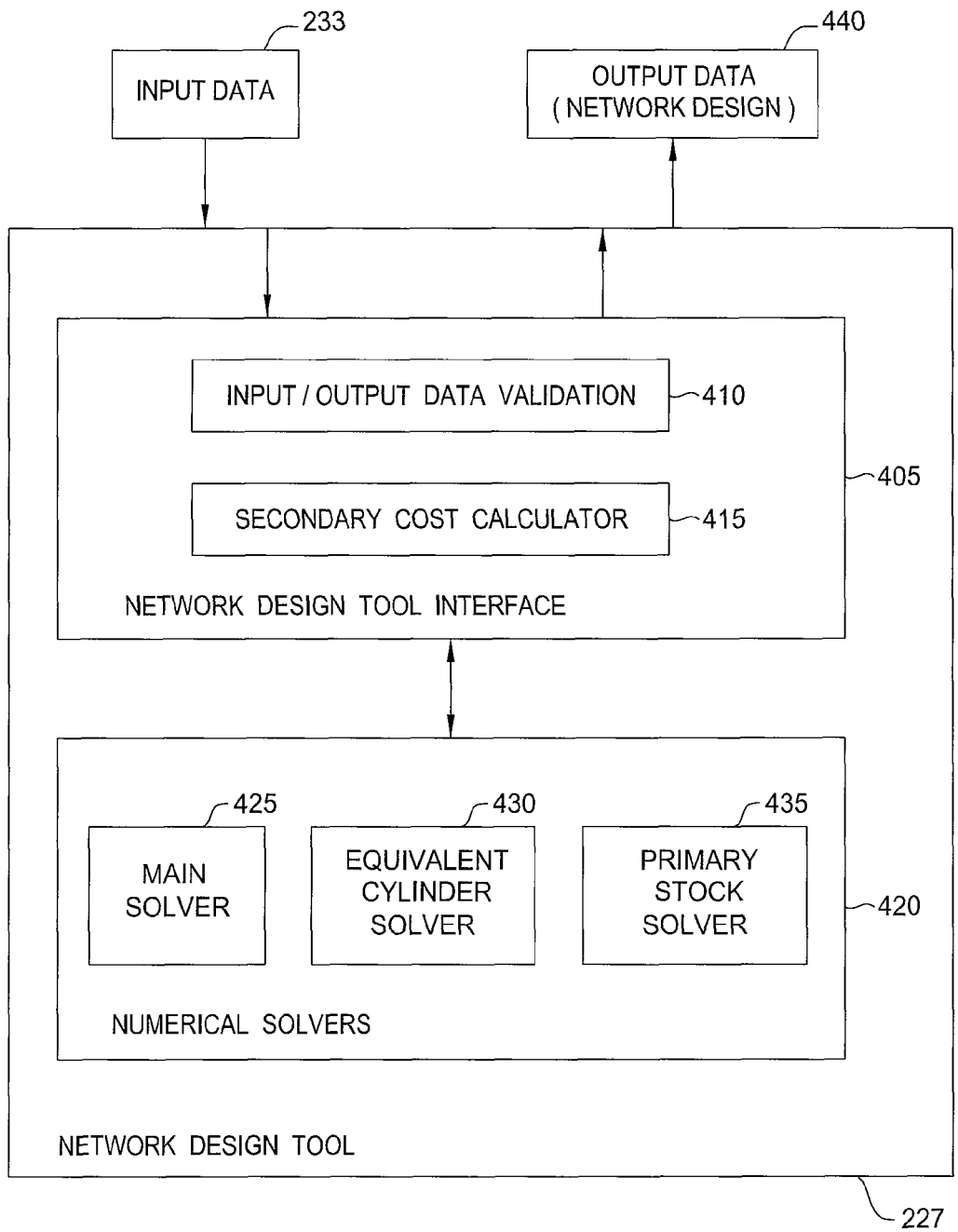
FIG. 4 further illustrates the network design tool first shown in FIG. 2, according to one embodiment of the invention.

FIG. 4 further illustrates the network design tool 227 first shown in FIG. 2, according to one embodiment of the invention. As shown, the network design tool 227 includes a network design tool interface 405 and numerical solvers 420. The interface 405 includes an input/output data validation component 410 and a secondary cost calculator 415. The interface 410 generally provides a user interface to access the network design tool 210 and is responsible for handling input/output and data pre-processing for the deign tool 227. The input/output data validation component 410 provides a set of APIs (application programmer interfaces) for reading the data from any database source (e.g., a relational database, a spreadsheet, or a CSV file). The input checker validates the input against the minimal data requirements. For example, input/output data validation component 410 may verify that the input data 233 is in agreement with the mathematical model such as minimum filling plants should not be greater than maximum filling plants allowed in the global parameters input. Similarly, the input/output data validation component 410 may validate the output data 440 solver against the input data 233. The secondary cost calculator 415 calculates a cost per equivalent cylinder for each location and customer combination. This information is provided with the input data for the numerical solvers 420. The network structure is sensitive to these costs, as the numerical solvers determine the cheapest location for a given customer to be served from.

The numerical solvers 420 provide the optimization engine of the network design tool 227. The design tool interface 405 provides the data to create a problem instance and the numerical solvers 420 provides the solution back to the design tool interface 405. As shown, the numerical solvers include a main solver 425, and equivalent cylinder solver 430 and a primary stock solver 435.

The main solver 425 may be configured to solve the complete mixed integer programming (MIP) problem represented by the input data with no relaxation or pre-processing. Accordingly, it may provide an optimal solution (relative to the input data 233) but it takes a very long computation time. For instance, a test case with 8 potential locations, 5 types of filling tools, 350 customers and a set of 15 different products, takes 3 hours and half to find the optimal solution. Real life problems regularly contain thousand of customers and products. Therefore, the scope of the main solver 425 is limited to usage on small test cases. However, the main solver 425 can be used to provide reference solutions for simple test cases relatively to solutions obtained through other approximate or heuristics algorithms. Accordingly, the equivalent cylinder solver 430 and the primary stock solver 435 may be used to determine a good approximation of the optimal solution in a reasonable time by simplifying the input problem.

In one embodiment, the equivalent cylinder solver 430 may be configured to merge all products (i.e., gas mixtures available for distribution to customers) into one "unique" product by using the equivalent cylinder rate, and then solves the new problem. That is, equivalent cylinder solver 430 treats all products as the same, thus variables are no longer depending on products, simplifying the computational requirements to generate a solution. For example, all cylinders (and products) may be normalized to a reference unit of volume based on a B50 cylinder (i.e. 50-liter water capacity compressed gas cylinder) for transportation on a truck.

The equivalent cylinder solver 430 may be used determine locations to open/close as filling plants or hubs, without regard for the products filled/delivered from the filling pants/hubs. The equivalent cylinder solver 430 provides an approach to fix secondary transport and localization decisions (i.e., which hub should deliver to which customer, without regard for the products actually being delivered). As it doesn't treat different types of products, the filling tools installed at the filling plants are not significant to the equivalent cylinder solver 430. This results in a considerably short solving time. This solver can be used when the dataset is very large and the main interest is to establish the network configuration whereas the resource/inventory optimization can be solved in another optimization step.

In order to solve the multi-product problem, a decomposition method can be applied, resulting in a two step solving process. In the first step, the equivalent cylinder solver 430 can be used to determine the hubs/plants locations. Moreover, the customers' allocation to hubs is also established by using results from equivalent cylinder solver 430. In a second step, the residual problem (filling plants among opened hubs, production in filling plants, primary transport and inventory) is solved based on the multi-product model. Therefore, in the second step, the constraints of the residual problem are limited to open hubs from equivalent cylinder solution; and customers linked to a location fixed also by equivalent cylinder solution.

The primary stock solver 435 performs the second part of the two step solving process. In one embodiment, the primary stock solver 435 determines whether a hub in the solution generated by the equivalent cylinder solver 430 should be a filling plant or not. Additionally, the primary stock solver 435 may determine which filling tools should be installed on each filling plant, inventory level on each filling plant, and primary transport for multi-commodity flows, while retaining the secondary transportation flows determined by the equivalent cylinder solver 430.

Figure 6B:
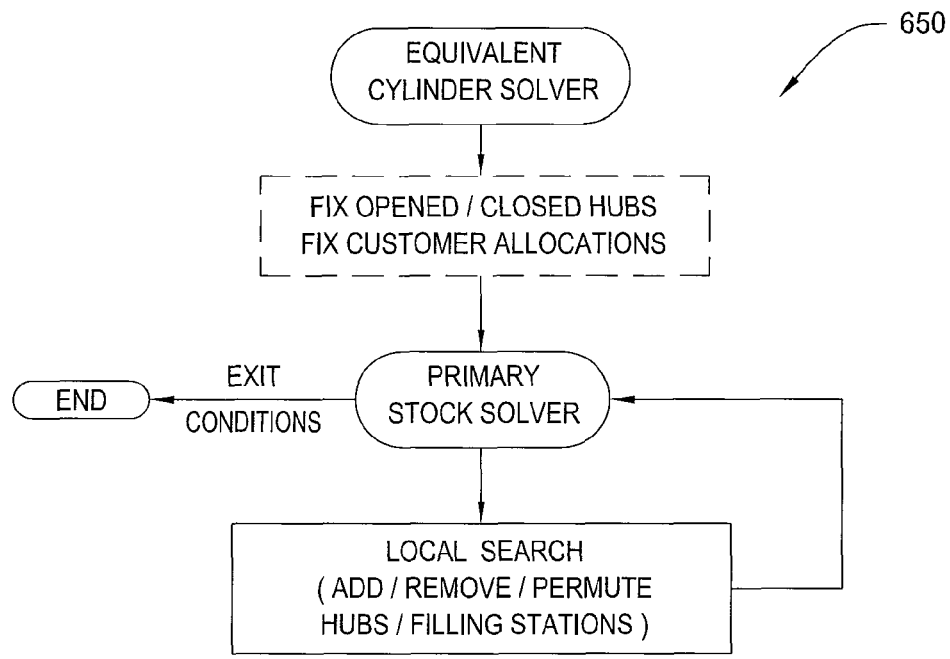
FIG. 6A-6B illustrates a heuristic approach applied to a two step solver in optimizing a supply chain for a cylinder distribution network, according to one embodiment of the invention.
Figure 6A:
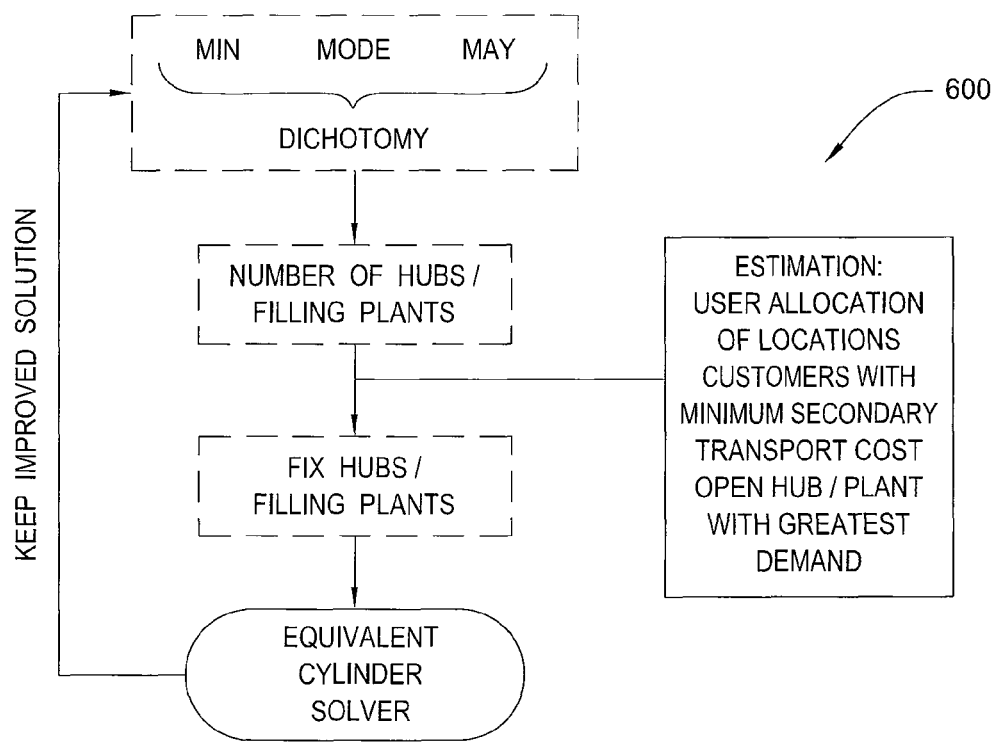

In one embodiment, the two step approach using the primary stock solver 435 and the equivalent cylinder solver 430 may be further improved using certain heuristics. For example, in one embodiment, the number of filling plants opened/closed may be fixed as input. In such a case, the equivalent cylinder solver 430 may be used to solve the residual problem. The number of plants to be opened (or closed) may be determined using a dichotomous technique, where the number of plants to is between input bounds on the number of plants. That is, for a given number N of hubs and filling plants, a user estimates the locations to be opened, and tries to allocate customers to hubs such to minimize secondary transpiration costs. This results in the user specifying the opening of N hubs that have higher quantity of demand (according to the secondary network). Such plants are fixed as opened, and the equivalent cylinder solver 430 is invoked to optimize the rest. The iterative search on locations retains the best solution at each instance of the iterative loop. This approach relies on the fact that when a user fixes the filling plants, the resolution is fast and a root solution is found quickly. Once found, the iterative approach allows many possibilities of configuration of plants to be tested, leading to improved solution. This approach is shown graphically in FIG. 6A. Specifically, FIG. 6A shows a workflow 600 for using the heuristic equivalent cylinder solver approach just discussed.

In the same principle, a heuristic two step solver uses a heuristic algorithm to fix open/closed hubs and filling plants in the primary stock solver 435. First, it fixes plants given as output of equivalent cylinder solver 430 and solves the remaining multi-product problem with primary stock solver 435. Specifically, the primary stock solver then makes decisions concerning filling plants, production (filling tools, work units, quantity of products), inventory management and primary transport (primary flows, replenishment periods). Next, heuristic two step solver tries to move around this solution by setting a hub as a filling plant or setting a filling plant as a hub or exchanging the status between one hub and one filling plant and always solving the residual multi-product problem with primary stock solver 435, keeping the improved solution (if any). This approach is shown graphically in FIG. 6B. Specifically, FIG. 6B shows a workflow 650 for using a two-step heuristic solver just discussed.

Of course, one of ordinary skill in the art will recognize that the approach of the two step solver, which uses the equivalent cylinder solver 430 to determine secondary transportation and hub locations and then the primary stock solver 435 to determine filling plant versus hub decisions along with multi-product flows and primary transportation, may be adapted using a variety of other heuristic approaches, tailored to suit the needs of a particular case.

Figure 5:
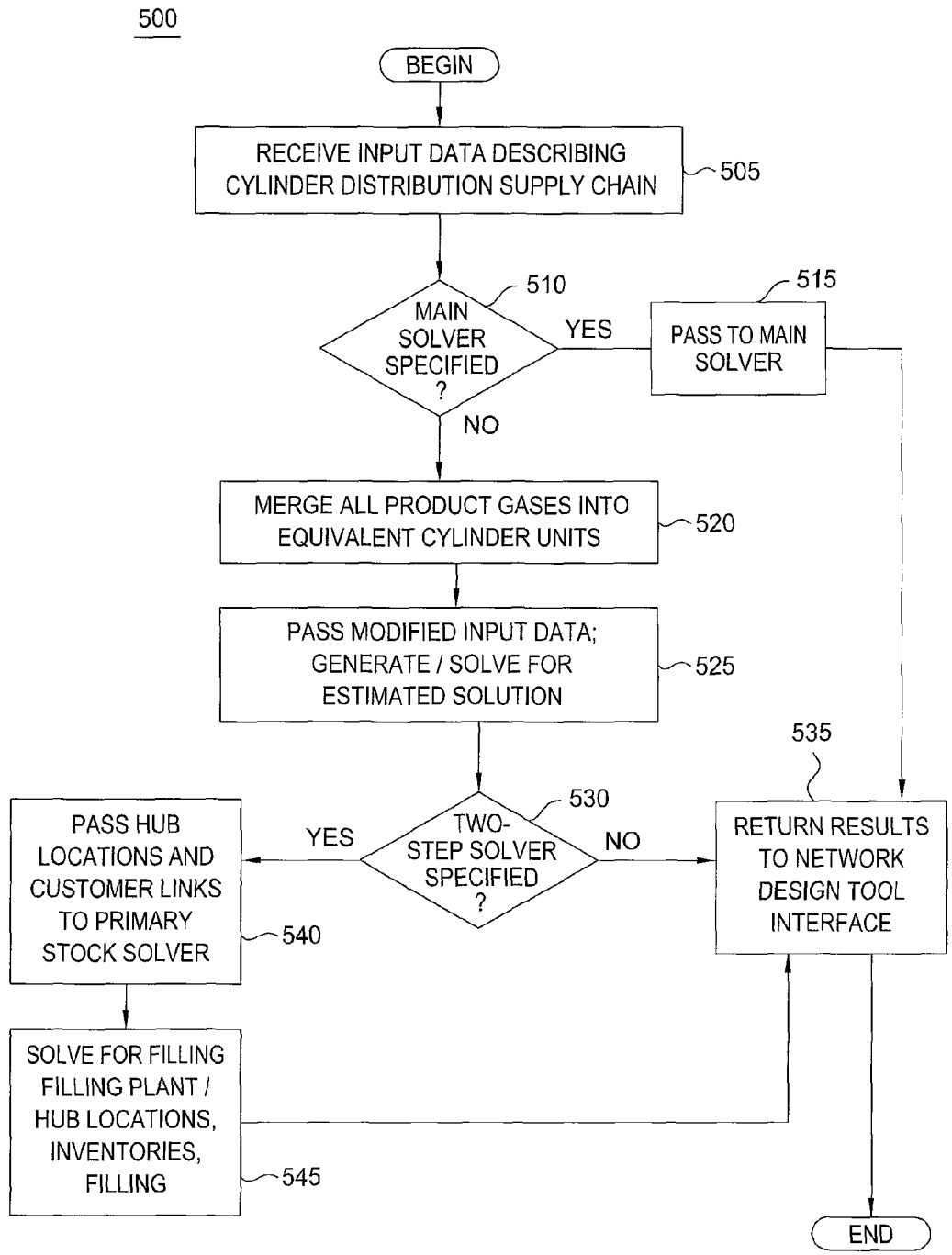
FIG. 5 illustrates a method for a two step solver in optimizing a supply chain for a cylinder distribution network, according to one embodiment of the invention.

FIG. 5 illustrates a method 500 for a two step solver in optimizing a supply chain for a cylinder distribution network, according to one embodiment of the invention. As shown, the method 500 begins at step 505 where the network design tool 227 receives input data describing a cylinder distribution supply chain problem. For example, the input data may describe some (or all) of the constraint data shown in FIG. 3. At step 510, the network design tool 227 determines whether the user has specified to solve the problem defined by the input data globally. If so, the input data is passed to the main solver at step 515, and once the main solver run is complete, results are returned to the user at step 535.

Otherwise, at step 520, the network design tool 227 merges all products defined in the input data (i.e., gas mixtures available for distribution to customers) into one "unique" product by using the equivalent cylinder rate. For example, the network design tool 227 may normalize cylinders (and products) to a reference unit of volume based on a B50 cylinder. At step 525, the network design tool 227 passes the input data to the equivalent cylinder solver, as modified to normalized products to a single product and equivalent cylinder. In turn, the equivalent cylinder solver solves the problem represented by the input data. As noted above, the equivalent cylinder solver may be configured to determine locations to open/close as filling plants or hubs, without regards for the products filled/delivered from the filling pants/hubs. For example, the equivalent cylinder solver 430 may fix secondary transport and localization decisions (i.e., which hub should deliver to which customer, without regard for the products actually being delivered). That is, the equivalent cylinder solver 430 determines the hub/filling plant locations and secondary transportation routes. If a two-step solver has not been specified, then the results of the equivalent cylinder solver 430 are returned to the user. Otherwise, at step 540, the hub locations and customer links are passed to the primary stock solver, which, at step 545, solves for filling plant; hub locations, inventories, filling tools, and multi product transpiration flows, based on the results of the equivalent solver. Once the primary stock solver generates a solution, from the partial solution generated by the equivalent stock solver and the remaining input data, results are retuned to the user (step 535). Further, the two-step approach shown illustrated by the method 500 of FIG. 5 may be adapted to use either of the heuristic approaches discussed above; namely the equivalent cylinder heuristic approach shown in FIG. 6A or the heuristic two step solver approach shown in FIG. 6B. Of course, other heuristic approaches or adaptations of the two step approach may be apparent to one of ordinary skill in the art as well.

Advantageously, the network design tool described above facilitates strategic decision making for a producer/distributor of a commodity products (e.g., molecular gas mixtures stored in cylinders) by incorporating transportation costs (i.e., operational decisions) into the strategic decision making process. Further, the network design tool also integrates investment decision costs, which are usually considered 'tactical decisions', into the strategic decision process (e.g., which filling tools are assigned to which plant/hub location). The network design tool implements different algorithm approaches allowing a user to obtain optimal, near-optimal, and approximate solutions. More simply, unlike currently available strategic design tools, the network design tool disclosed herein takes into consideration, simultaneously, production, inventory, transportation, and investment decisions when making strategic recommendations (e.g., optimal plant/hub locations) for real, large-scale commodity distribution networks.

Of course, It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method for determining a configuration for a supply chain for a cylinder gas distribution network, the method comprising:
receiving a set of input data characterizing attributes of the supply chain to be configured, wherein the input data includes at least (i) a set of potential locations for one or more distribution hubs and one or more filling plants for the supply chain, (ii) a set of one or more customer locations, (iii) a set of one or more products available to be delivered to the customers from the distribution hubs;
merging the input data characterizing the set of one or more products into normalized data characterizing one normalized product, wherein the normalized product is based on a uniform reference volume for cylinders distributed using the supply chain;
determining, by operation of an equivalent cylinder solver executing on a processor, a secondary transportation solution, wherein the secondary transportation solution fixes one or more locations for distribution hubs from the set of potential locations, and specifies transportation flows from the fixed distribution hubs to each of the set of one or more customers using the normalized product;
determining, by operation of a primary stock solver executing on the processor, a primary transportation solution, wherein the primary transportation solution fixes one or more locations for filling plants, from the set of potential locations, and specifies transportation flows from the fixed filling plants to the fixed distribution hubs using the secondary transportation solution; and
applying a heuristic rule to at least a first one of the distribution hubs fixed by the equivalent cylinder solver, wherein the heuristic rule fixes the first one of the distribution hubs as a filling plant in the primary transportation solution determined by the primary stock solver.

2. The computer-implemented method of claim 1, wherein the input data further characterizes a set of one or more filling tools available to be used at the filing plants.

3. The computer-implemented method of claim 2, wherein the primary stock solver is further configured to specify a set of one or more filing tools to use at each of the filling plants.

4. The computer-implemented method of claim 1, wherein the primary stock solver is further configured to fix at least a first one of the filling plants by selecting one of the fixed hub locations determined by the equivalent cylinder solver and fixing the selected hub as the first filling plant in the primary transportation solution.

5. The computer-implemented method of claim 1, wherein the primary stock solver is a mixed integer program (MIP) solver.

6. A non-transitory computer-readable storage medium containing network design tool configured to perform an operation to determine a configuration for a supply chain for a cylinder gas distribution network, the operation comprising:
receiving a set of input characterizing attributes of the supply chain to be configured, wherein the input data includes at least (i) a set of potential locations for one or more distribution hubs and one or more filling plants for the supply chain, (ii) a set of one or more customer locations, (iii) a set of one or more products available to be delivered to the customers from the distribution hubs;
merging the input data characterizing the set of one or more products into normalized data characterizing one normalized product, wherein the normalized product is based on a uniform reference volume for cylinders distributed using the supply chain;

determining, by operation of an equivalent cylinder solver, a secondary transportation solution, wherein the secondary transportation solution fixes one or more locations for distribution hubs from the set of potential locations, and specifies transportation flows from the fixed distribution hubs to each of the set of one or more customers using the normalized product;

determining, by operation of a primary stock solver, a primary transportation solution, wherein the primary transportation solution fixes one or more locations for filling plants, from the set of potential locations, and specifies transportation flows from the fixed filling plants to the fixed distribution hubs using the secondary transportation solution; and applying a heuristic rule to at least a first one of the distribution hubs fixed by the equivalent cylinder solver, wherein the heuristic rule fixes the first one of the distribution hubs as a filling plant in the primary transportation solution determined by the primary stock solver.

7. The non-transitory computer-readable storage medium of claim 6, wherein the input data further characterizes a set of one or more filling tools available to be used at the filing plants.

8. The non-transitory computer-readable storage medium of claim 7, wherein the primary stock solver is further configured to specify a set of one or more filing tools to use at each of the filling plants.

9. The non-transitory computer-readable storage medium of claim 6, wherein the primary stock solver is further configured to fix at least a first one of the filling plants by selecting one of the fixed hub locations determined by the equivalent cylinder solver and fixing the selected hub as the first filling plant in the primary transportation solution.

10. The non-transitory computer-readable storage medium of claim 6, wherein the primary stock solver is a mixed integer program (MIP) solver.

11. A system, comprising:
a processor; and
a memory storing a network design tool, which when executed on the processor performs an operation to determine a configuration for a supply chain for a cylinder gas distribution network, the operation comprising:
receiving a set of input data characterizing attributes of the supply chain to be configured, wherein the input data includes at least (i) a set of potential locations for one or more distribution hubs and one or more filling plants for the supply chain, (ii) a set of one or more customer locations, (iii) a set of one or more products available to be delivered to the customers from the distribution hubs, merging the input data characterizing the set of one or more products into normalized data characterizing one normalized product, wherein the normalized product is based on a uniform reference volume for cylinders distributed using the supply chain, determining, by operation of an equivalent cylinder solver, a secondary transportation solution, wherein the secondary transportation solution fixes one or more locations for distribution hubs from the set of potential locations, and specifies transportation flows from the fixed distribution hubs to each of the set of one or more customers using the normalized product, determining, by operation of a primary stock solver, a primary transportation solution, wherein the primary transportation solution fixes one or more locations for filling plants, from the set of potential locations, and specifies transportation flows from the fixed filling plants to the fixed distribution hubs using the secondary transportation solution, and applying a heuristic rule to at least a first one of the distribution hubs fixed by the equivalent cylinder solver, wherein the heuristic rule fixes the first one of the distribution hubs as a filling plant in the primary transportation solution determined by the primary stock solver.

12. The system of claim 11, wherein the input data further characterizes a set of one or more filling tools available to be used at the filing plants.

13. The system of claim 12, wherein the primary stock solver is further configured to specify a set of one or more filing tools to use at each of the filling plants.

14. The system of claim 11, wherein the primary stock solver is further configured to fix at least a first one of the filling plants by selecting one of the fixed hub locations determined by the equivalent cylinder solver and fixing the selected hub as the first filling plant in the primary transportation solution.

15. The system of claim 11, wherein the primary stock solver is a mixed integer program (MIP) solver.

* * * * *